US011257332B2

(12) United States Patent
Fong

(10) Patent No.: US 11,257,332 B2
(45) Date of Patent: Feb. 22, 2022

(54) GAMING SYSTEM

(71) Applicant: Aristocrat Technologies Australia Pty Limited, North Ryde (AU)

(72) Inventor: Colin Fong, Penshurst (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 16 days.

(21) Appl. No.: 16/736,126

(22) Filed: Jan. 7, 2020

(65) Prior Publication Data

US 2020/0234545 A1 Jul. 23, 2020

(30) Foreign Application Priority Data

Jan. 23, 2019 (AU) ................................ 2019200462

(51) Int. Cl.
*G07F 17/34* (2006.01)
*G07F 17/32* (2006.01)
*G06F 7/58* (2006.01)

(52) U.S. Cl.
CPC .............. *G07F 17/34* (2013.01); *G06F 7/588* (2013.01); *G07F 17/3213* (2013.01); *G07F 17/3239* (2013.01); *G07F 17/3244* (2013.01); *G07F 17/3265* (2013.01)

(58) Field of Classification Search
CPC .... G07F 17/34; G07F 17/588; G07F 17/3213; G07F 17/3244; G07F 17/3265; G07F 17/3239
USPC .......................................................... 463/20
See application file for complete search history.

(56) References Cited

U.S. PATENT DOCUMENTS

| 7,699,316 | B2 | 4/2010 | Seelig et al. |
| 7,798,895 | B2 | 9/2010 | Jubinville et al. |
| 8,998,702 | B2 | 4/2015 | Frank et al. |
| 9,189,927 | B2 | 11/2015 | Cuddy et al. |

(Continued)

OTHER PUBLICATIONS

Wikipedia, "Game mechanics", published on May 1, 2018 retrieved via waybackmaching.org on Sep. 9, 2021 from Internet URL<http://web.archive.org/web/20180501204520/https://en.wikipedia.org/wiki/Game_mechanics>, p. 1-10 (Year: 2018).*

*Primary Examiner* — Jay Trent Liddle
*Assistant Examiner* — Ryan Hsu
(74) *Attorney, Agent, or Firm* — Armstrong Teasdale LLP

(57) ABSTRACT

A gaming system is disclosed that comprises a game controller that includes at least one processor and at least one memory device that are operably connected. The memory device(s) store computer-readable instructions for controlling the at least one processor to cause prize indicia to be displayed, each prize indicium corresponding to a spot prize awardable to a player, and cause a symbol array to be selected and displayed such that the symbol array and the prize indicia move relative to each other. The instructions also control the processor to select at least one spot prize corresponding to at least one prize indicium, determine at least one prize symbol to be added to the symbol array, corresponding to the respective selected at least one spot prize, and allocate a Wild function to the at least one added prize symbol. The instructions also control the processor to present the spot prize corresponding to the at least one added prize symbol, determine whether the symbol array corresponds to a winning outcome, and present a winning outcome prize if a winning outcome is determined to exist.

20 Claims, 15 Drawing Sheets

(56) References Cited

U.S. PATENT DOCUMENTS

| | | | |
|---|---|---|---|
| 2008/0058068 A1 | 3/2008 | Bennett et al. | |
| 2009/0075717 A1* | 3/2009 | Jaffe | G07F 17/34 |
| | | | 463/20 |
| 2010/0029381 A1* | 2/2010 | Vancura | G07F 17/3244 |
| | | | 463/30 |
| 2010/0210347 A1 | 8/2010 | Seelig et al. | |
| 2011/0003636 A1* | 1/2011 | Thomas | G07F 17/3258 |
| | | | 463/27 |
| 2011/0111826 A1* | 5/2011 | Baerlocher | G07F 17/34 |
| | | | 463/20 |
| 2013/0095905 A1* | 4/2013 | Aoki | G07F 17/3265 |
| | | | 463/20 |
| 2013/0155742 A1* | 6/2013 | Lee | H02M 7/103 |
| | | | 363/126 |
| 2015/0325079 A1 | 11/2015 | Alsip | |
| 2019/0130704 A1* | 5/2019 | Cormack | G07F 17/3213 |

\* cited by examiner

| Reel position | Reel 1 | Reel 2 | Reel 3 | Reel 4 | Reel 5 |
|---|---|---|---|---|---|
| 1 | Pic 1 | 10 | Pic 3 | Q | Pic 1 |
| 2 | Wild | Q | K | A | 10 |
| 3 | J | K | 10 | 10 | A |
| 4 | Q | A | Q | Pic 2 | Pic 2 |
| 5 | 10 | Pic 2 | K | J | A |
| 6 | A | 9 | Pic 1 | Wild | Q |
| 7 | Pic 2 | Wild | J | 9 | K |
| 8 | A | Pic 3 | K | 10 | Pic 2 |
| 9 | Q | Q | 9 | A | 9 |
| 10 | K | 10 | Q | Q | Wild |
| 11 | J | A | 10 | J | 9 |
| 12 | 10 | Wild | Wild | K | Q |
| 13 | Pic 3 | K | A | Wild | 10 |
| 14 | Wild | J | A | Pic 3 | Wild |
| 15 | 9 | 10 | Wild | Pic 1 | A |

*FIG. 4*

GAMING SYSTEM

CROSS REFERENCE TO RELATED APPLICATIONS

This application is a continuation of and claims priority to AU Application No. 2019200462, filed Jan. 23, 2019, and titled "A GAMING SYSTEM", which is incorporated herein by reference in its entirety.

FIELD

The present application relates to a gaming system and to a method of gaming.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

A described gaming system implements a game that provides the player with a feature wherein prize indicia that may include cash indicia and jackpot indicia are displayed and a symbol array is displayed in front of the prize indicia. The symbol array and prize indicia move relative to each other and as this occurs the game provides the player with the impression that at least one prize is awarded to the symbol array by moving at least one displayed prize indicium to the symbol array. After the or each prize indicium is added to the symbol array, a prize symbol is displayed at a selected symbol position. The added prize symbol corresponds to a spot prize and is also used to determine a game outcome.

A gaming system is described that comprises at least one display, a game controller that includes at least one processor and at least one memory device. The at least one processor, the at least one memory device, and the at least one display are operably connected. The at least one memory device stores computer-readable instructions for controlling the at least one processor to cause prize indicia to be displayed on the at least one display, each prize indicium corresponding to a spot prize awardable to a player. The processor is also controlled to cause a symbol array to be selected and displayed on the at least one display such that the symbol array and the prize indicia move relative to each other. The processor is also controlled to select at least one spot prize corresponding to at least one prize indicium, add at least one prize symbol corresponding to the respective selected at least one spot prize to the symbol array, allocate a Wild function to the at least one added prize symbol, and award the spot prize corresponding to the at least one added prize symbol. The processor is also controlled to determine whether the symbol array corresponds to a winning outcome, and award a winning outcome prize if a winning outcome is determined to exist.

A method of gaming is described that comprises displaying prize indicia on at least one display, each prize indicium corresponding to a spot prize awardable to a player, and selecting and displaying a symbol array on the at least one display such that the symbol array and the prize indicia move relative to each other. The method also comprises selecting at least one spot prize corresponding to at least one prize indicium, adding at least one prize symbol corresponding to the respective selected at least one spot prize to the symbol array, and allocating a Wild function to the at least one added prize symbol. The method also comprises awarding the spot prize corresponding to the at least one added prize symbol, determining whether the symbol array corresponds to a winning outcome, and awarding a winning outcome prize if a winning outcome is determined to exist.

BRIEF DESCRIPTION OF THE DRAWINGS

FIG. 4 illustrates an example reel strip layout.

DETAILED DESCRIPTION

The detailed description presents innovations in user interface ("UI") features of electronic gaming devices, as well as innovations in features of backend processing to implement the UI features. For example, processes for electronic gaming machines ("EGMs") that cause prize indicia and a symbol array to be displayed such that the prize indicia and symbol array move relative to each other are described. In example implementations, control logic controls the EGM to determine prize symbols to be added to the symbol array on the UI, and allocate a wild function to the determined prize symbols, while the prize indicia and symbol array are moving relative to each other on the UI, which is an example of a process. Typically, prize symbols include symbols of greater interest to a user due to their enhanced value when calculating win conditions (e.g., wild symbols, special character symbols). As such, determining prize symbols to be added to the symbol array on the UI, and adding prize symbols to the symbol array on the UI, can achieve a desired game volatility (e.g., increase game volatility) while maintaining a designated level of RTP. Furthermore, by selecting prize symbols to be added to the symbol array on the UI, and thereby selecting prize symbols to not be added to the symbol array on the UI, game play can be kept fair and consistent with regulations while also enabling variation of game volatility for a designated level of RTP.

Figure 1:
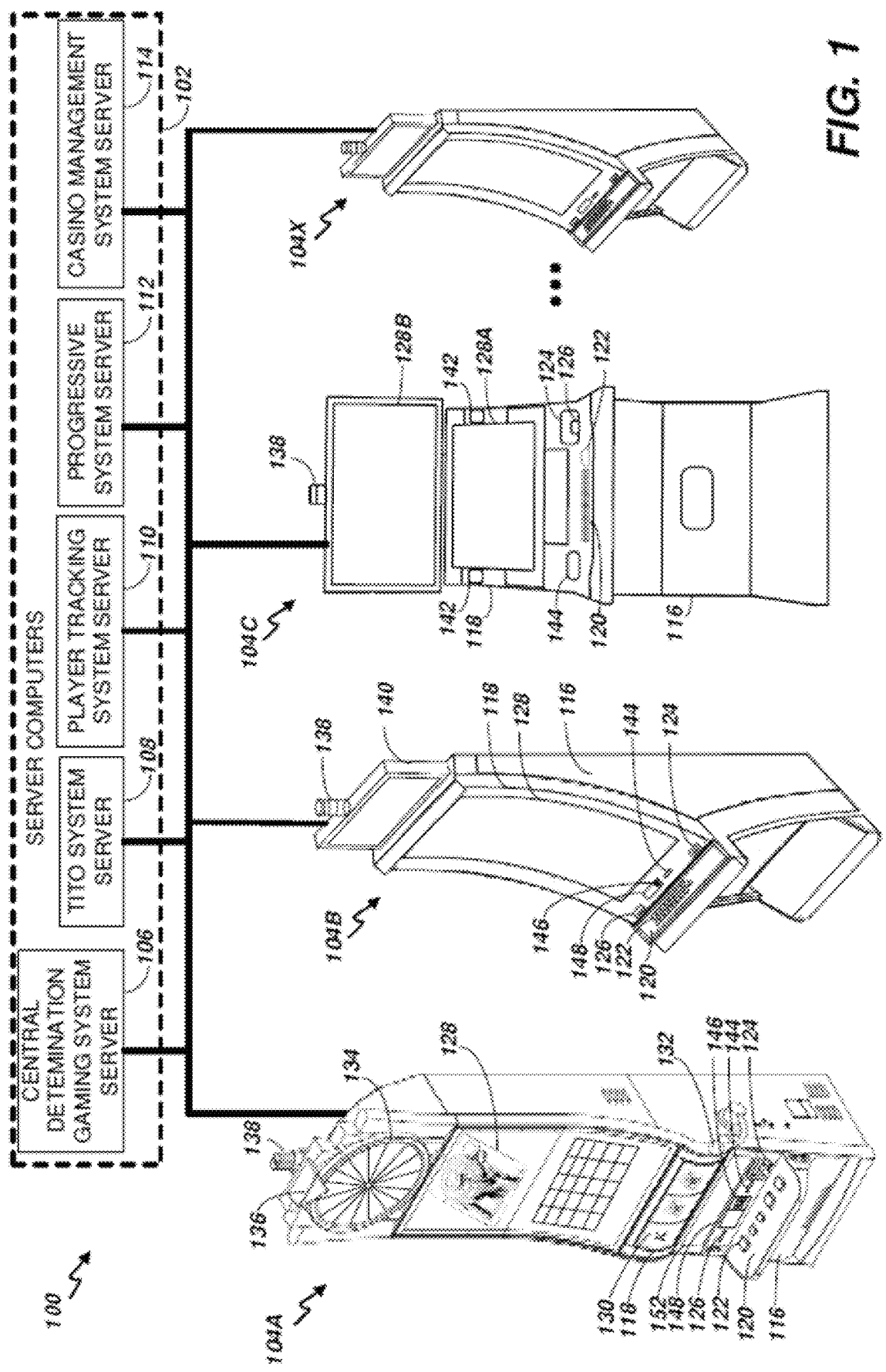
FIG. 1 is an exemplary diagram showing several EGMs networked with various gaming related servers.

FIG. 1 illustrates several different models of EGMs which may be networked to various gaming related servers. The embodiment described in the present disclosure can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, server computers 102 may not be necessary in embodiments where the technical features described herein can be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
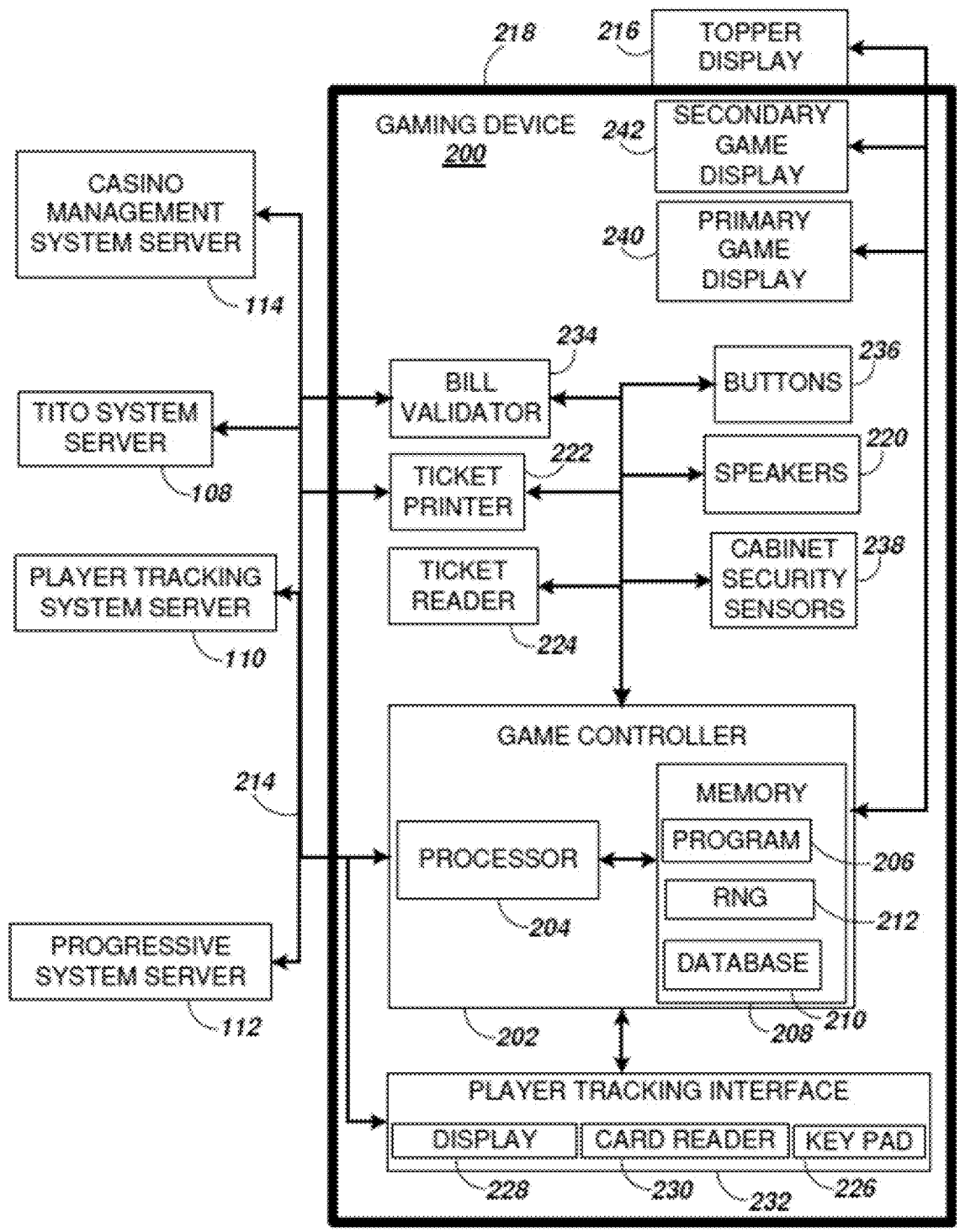
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments as described herein necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the RNG 212 is a pseudo-RNG.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

One regulatory requirement for games running on gaming device 200 generally involves complying with a certain level of randomness (e.g., that outcomes will be statistically independent, uniformly distributed over their range, unpredictable and pass statistical tests such as chi-square test, equi-distribution test, gap test, runs test, serial correlation test, etc.). Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG 212 can be integrated into the game controller 202 or processor 204. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. (Gaming regulations may require that each reel outcome be independent of each other reel outcome, such that no reel outcome depends on any other reel outcome.) In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%).

A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

To meet a designated RTP, a game developer can utilize one or more lookup tables (e.g., weighted tables) to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. A RNG conversion operation could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

For example, in embodiments described herein, the location and/or movement of prize indicia in a prize indicia display area may be determined at least in part by a value returned from a RNG. In at least some of these embodiments, the value returned from the RNG may be mapped to a particular position. Further, the value returned from the RNG may be mapped to a particular position based at least in part on a range of potential return values from the RNG stored in at least one memory device. In some embodiments, a memory may store computer-readable instructions for controlling a processor to determine a prize symbol to be added to the symbol array based on an RNG outcome.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of pay lines may be fixed. In other embodiments, the available selections may include different numbers of ways to win instead of different numbers of pay lines.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
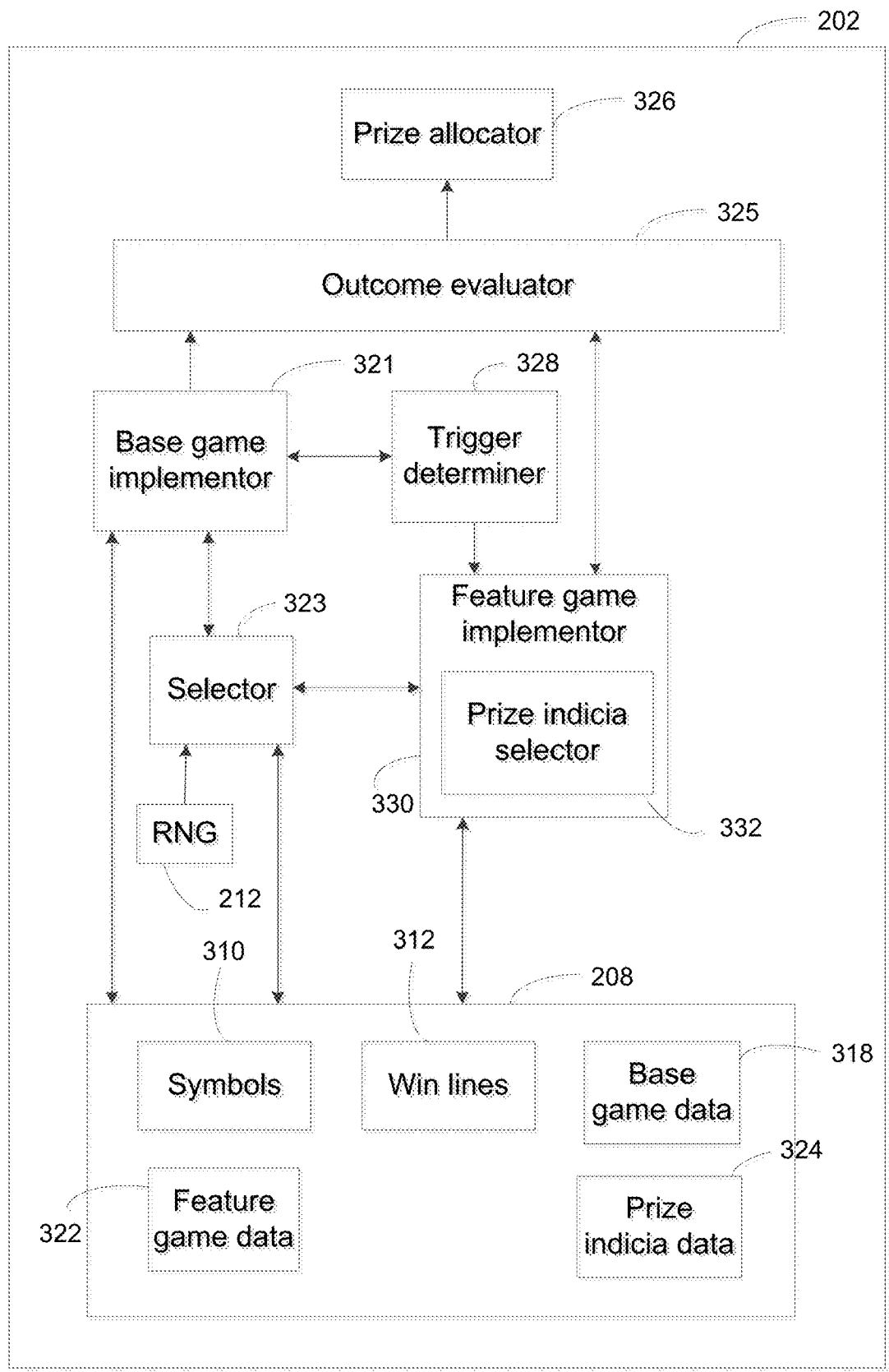
FIG. 3 is a block diagram showing functional components implemented by a game controller.

FIG. 3 illustrates a block diagram showing functional components implemented by the game controller 202. In this example, the functional components comprise data stored in the memory 208, including data indicative of symbols 310, data indicative of win lines 312, base game data 318 defining characteristics of a base game, and feature game data 322 defining characteristics of a feature game. The memory 208 also includes prize indicia data 324 indicative of spot prizes that may be obtained during a feature game.

The functional components also include a base game implementer 321 arranged to implement base games using a selector 323 to select symbols using the symbols data 310 for display at a plurality of symbol positions in a symbol array, for example using the RNG 212. Outcomes of a base game are determined by an outcome evaluator 325 and any applicable prize is awarded by a prize allocator 326, for example based on a base game pay table.

In this example, the functional components also include a trigger condition determiner 328 arranged to make a determination based on the outcome of an event during a base game as to whether to commence a feature or free game, for example based on whether a trigger condition has occurred during the base game such as selection and display of a defined combination of trigger symbols during the base game.

The functional components also include a feature game implementer 330, in this example that includes a prize indicia selector 332, that implements a feature game for example using the selector 323 to select one or more spot prizes defined by the prize indicia data 324.

In this example, the spot prizes may correspond to credit prizes of varying value and/or credit prizes associated with a jackpot. If at least one spot prize corresponds to a credit prize associated with a jackpot, a plurality of jackpots may be provided that correspond to different values referred to as MINI, MINOR, MAJOR AND GRAND jackpots. Such jackpots may be of progressive type wherein the gaming device progressively contributes an amount of credits to one or more jackpot pools based for example on defined conditions during game play. In this example, the jackpots have different values such that the jackpot values of the MINI, MINOR, MAJOR AND GRAND jackpots are of increasing size.

Outcomes of a feature game are in this example also determined by the outcome evaluator 324 and any applicable prize is awarded by the prize allocator 326.

During an example feature game, prize indicia corresponding to several different values of spot prizes and several different values of jackpot are displayed such that the prize indicia move around the display in an apparent random way. For example, the movement of the prize indicia shown in the display may be determined at least in part by a value returned from a RNG (e.g., RNG 212). In addition, the symbol array moves to a position in front of the moving prize indicia and moves around the display, in this example such that the speed of movement of the symbol array relative to the display is slower than the speed of movement of the prize indicia relative to the display. At least one prize indicium is selected and moved to the symbol array as a prize symbol such that an impression is given that the or each prize indicium has been grabbed from the background of moving prize indicia and moved to the symbol array moving in the foreground. In an example, the prize indicia includes representations of cash notes and text such as MINI, MINOR, MAJOR or GRAND to indicate the relevant size of jackpot. 'Grabbing' prize indicia causes the value of the 'grabbed' prize indicia to be added to the relevant player meter. In addition, the prize symbol(s) added to the symbol array are provided with a Wild function.

FIG. 4 illustrates an example of a set 400 of five reel strips 421, 422, 423, 424, 425. In the example, each reel strip has fifteen reel strip positions 401-415. Each reel strip position of each reel has a symbol. For example, a "Wild" symbol 431 occupies the sixth reel strip position 406 of the fourth reel 424. Other reel strips to those illustrated in FIG. 3 can be used, for example, reel strips where two or more wild symbols are placed at consecutive reel strip positions of a reel strip. In other examples, the reel strips could have between 30 and 100 reel strip positions. The actual length of the feature game reel strips would depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

Figure 5:
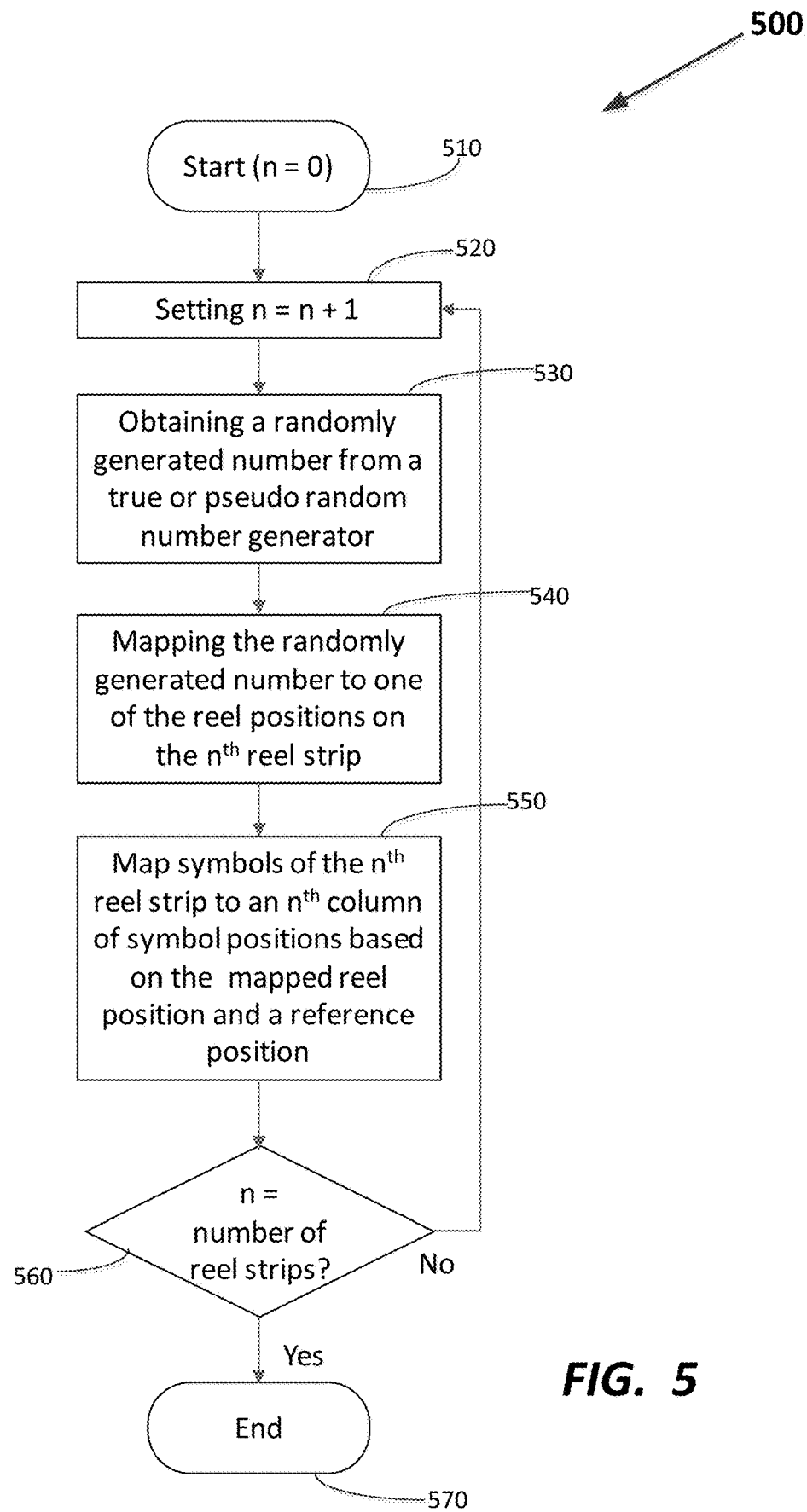
FIG. 5 is a flow chart of a symbol selection method.

FIG. 5 is a flow chart of a method 500 carried out by the processor 204 to select symbols from reel strips. At step 510, the processor 204 starts the process of selecting symbols with a counter (n) set at zero as symbols have not yet been selected from any reel strips. At step 520, the processor 204 increments the counter. In the first iteration, the counter is set to 1 to reflect that symbols are to be selected from a first reel strip. At step 530 the processor obtains a randomly generated number from a true or pseudo RNG 212. At step 540 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 550, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighbouring reel strip positions are also mapped to the symbol positions of the column. Referring to the example reel strips of FIG. 3, if the value returned by the RNG 212 is mapped to reel position 413, then for the first reel strip 421, "Pic3" symbol 443 is mapped to a bottom symbol position, "10" symbol 442 is mapped to a middle symbol position, and "J" symbol is mapped to a top symbol position.

At step 560, the processor 560 determines whether symbols have been selected for all of the reel strips, and if not the processor reverts to step 520 and iterates through steps 530, 540 and 550 until it is determined at step 560 that symbols have been selected from all n reel strips and mapped to all n columns of symbol positions after which the symbol selection process ends 570. Different numbers of symbols may be mapped to different numbers of symbol positions.

After the symbols of all reel strips have been mapped to symbol position, the processor 204 controls display 240 to display them at the symbol positions.

Example embodiments will now be described with reference to FIGS. 6 to 15 of the drawings.

Figure 6:
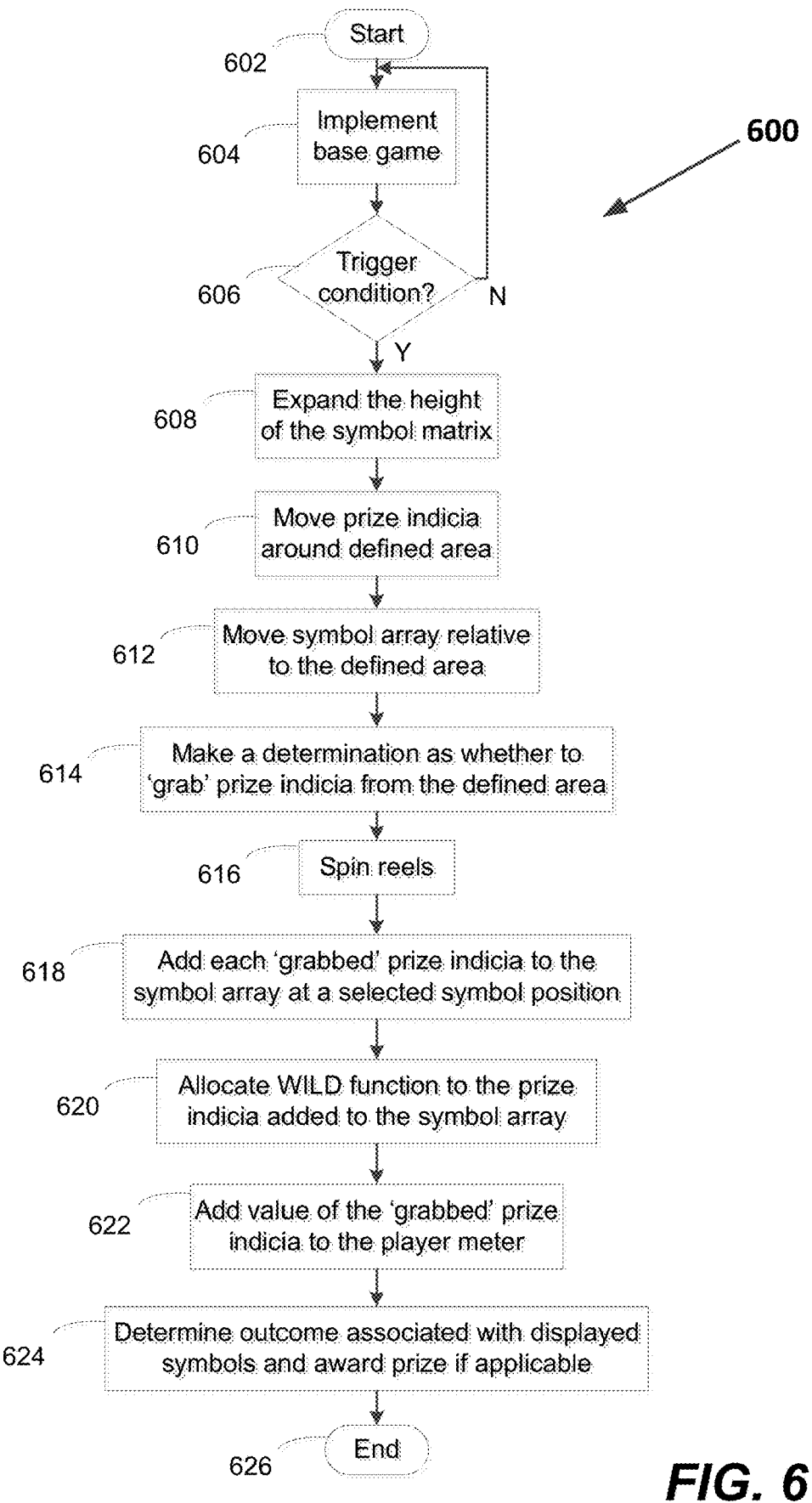
FIG. 6 is a flow chart illustrating an example game play process of an example method of gaming.

FIG. 6 shows a flow diagram 600 illustrating steps 602 to 626 of an example game implementation.

In this example, the system implements a base game, as indicated at step 604, and also subsequently implements a feature game that may include one or more free games, in this example if a trigger condition occurs, as indicated at step 606.

Figure 7:
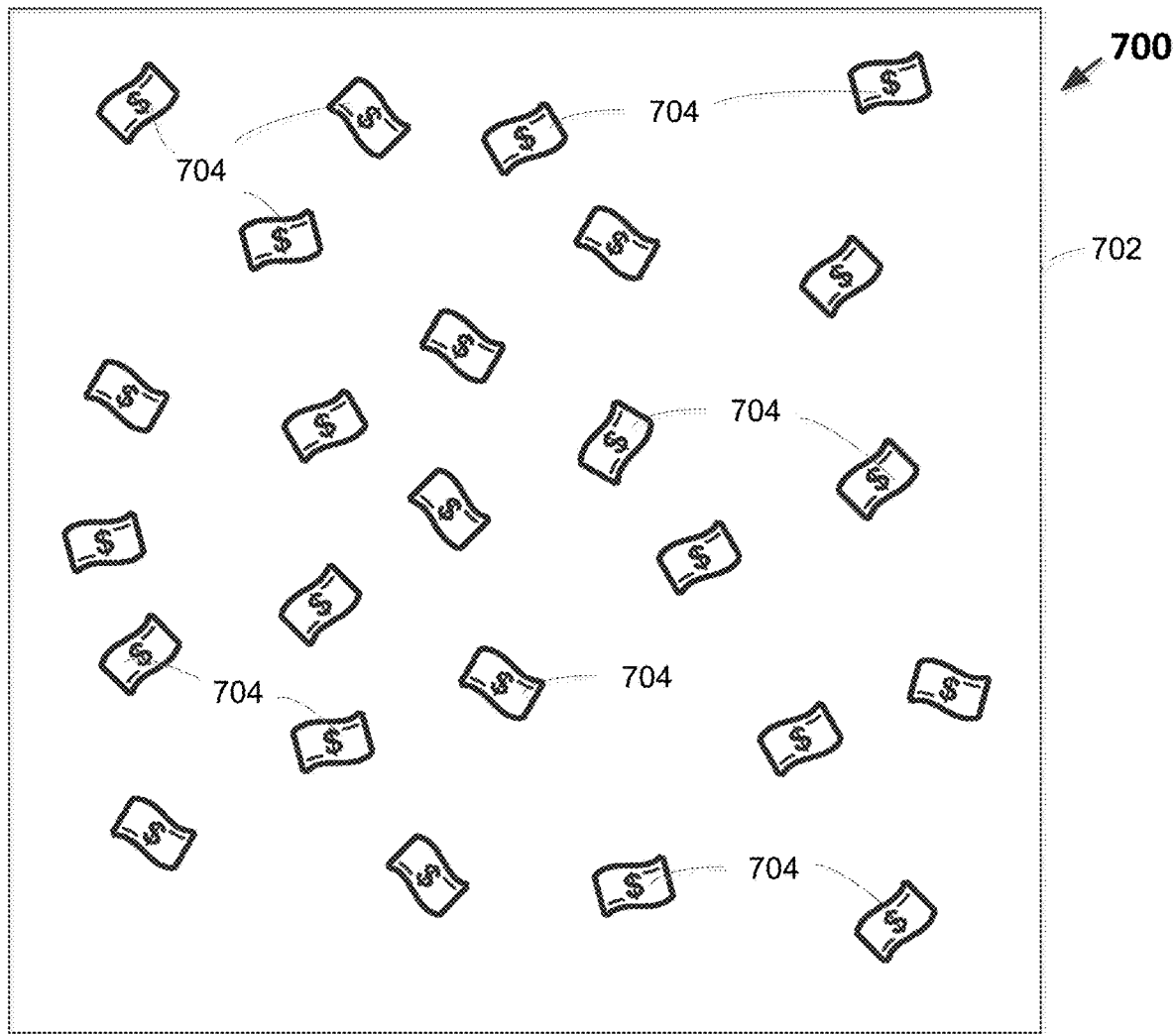
FIG. 7 is a representation of a base game screen displayed to a player during implementation of a base game.
Figure 7:
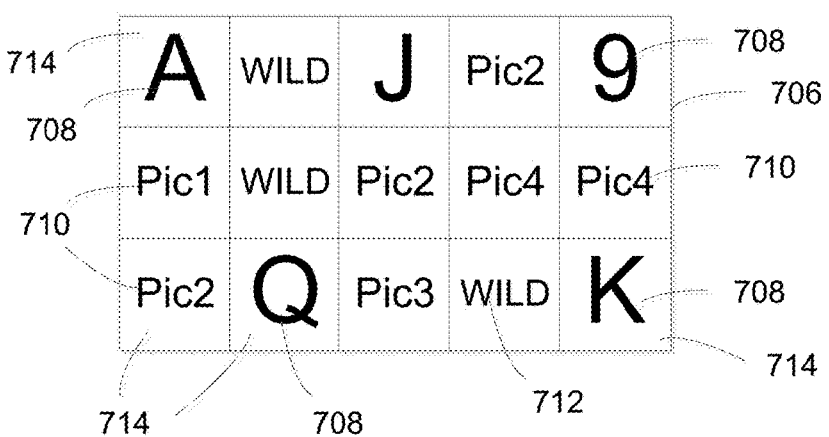

An example base game screen 700 displayed to a player during implementation of a base game is shown in FIG. 7.

The base game screen 700 includes a prize indicia display area 702 containing prize indicia 704 that in this example are caused to move around the prize indicia display area 702.

In this example, the prize indicia 704 comprises representations of bank notes, with each bank note representing a prize value. Separate to the prize indicia display area 702, in this example beneath the prize indicia display area 702, is a symbol array 706 containing a plurality of symbols selected from a set of symbols 310. In this example, the set of symbols include standard symbols 708, picture symbols 710, and Wild symbols 712.

In this example, the trigger condition may be selection and display of a defined symbol or a defined combination of symbols in a symbol array, for example selection and display of a plurality of 'scatter' symbols in the symbol array.

Figure 8:
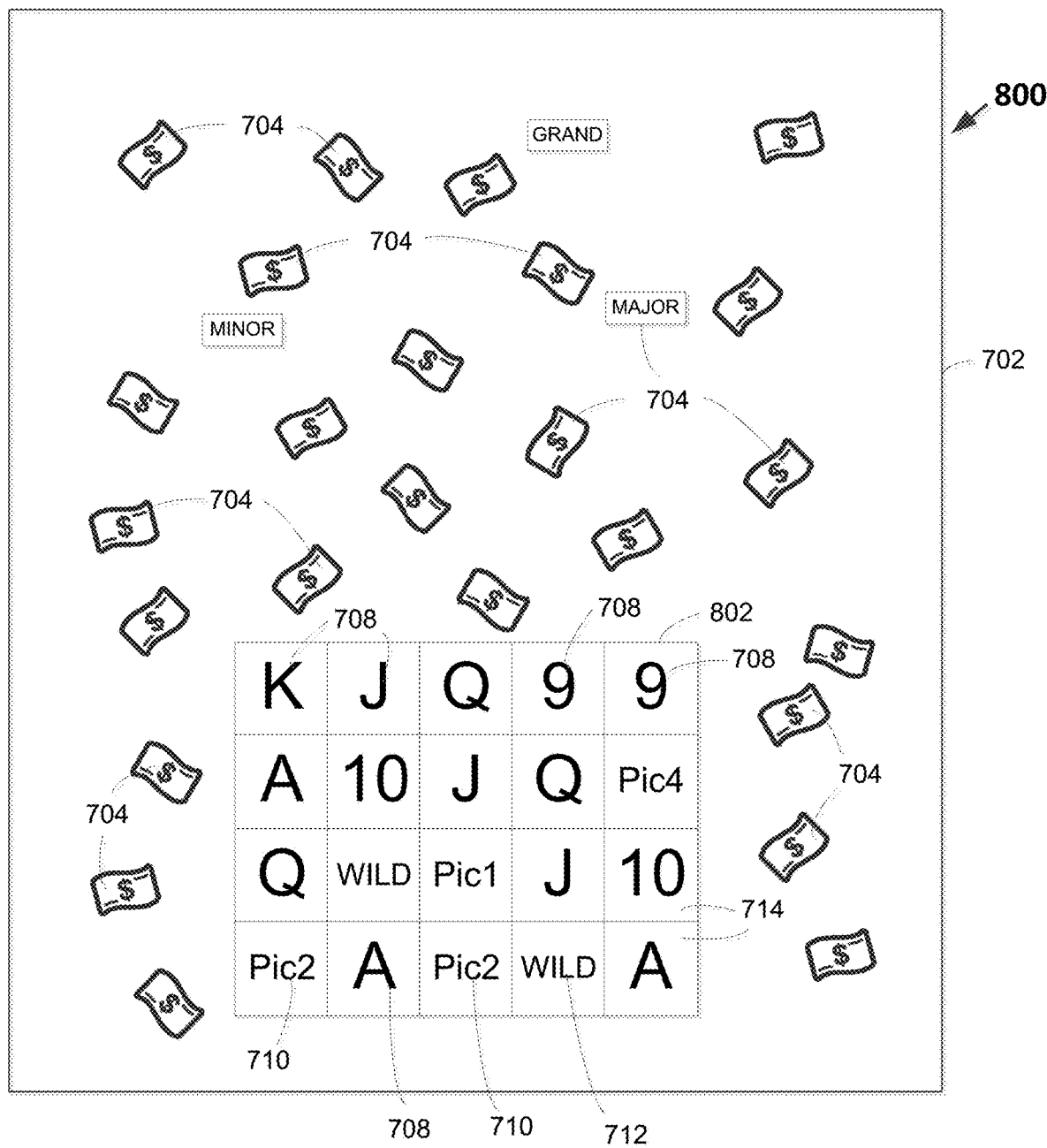
FIGS. 8 to 10 are representations of feature game screens displayed to a player during implementation of a feature game in an example embodiment described in the present disclosure.

According to an example feature game, after the feature game is triggered, a feature game screen 800 as shown in FIG. 8 is displayed. Like and similar features are indicated with like reference numerals. Upon triggering the feature game, a visual transition from FIG. 7 to FIG. 8 may be displayed. The visual transition may include the symbol array 706 moving from its originally occupied area into the prize indicia display area 702. The prize indicia display area 702 may remain the same size following the movement (as shown in FIG. 8), or may be expanded to include the area originally occupied by the symbol array 706 (not shown). Such an expansion in embodiments would make more effective use of the display area with portrait dimensions.

As shown in FIG. 8, the feature game screen 800 in this example includes a modified symbol array 802 that has at least one additional row of symbols compared to the symbol array used during the base game, as indicated at step 608. However, it will be understood that, as an alternative, a symbol array with more than 1 additional row may be used, or a symbol array that is the same size as the symbol array used in the base game may be used.

As indicated at step 610, in a similar way to the base game, the prize indicia display area 702 contains prize indicia 704 that are caused to move around the prize indicia display area 702, for example in a manner that appears to be random, for example, by using an RNG.

As indicated at step 612, in addition to moving the prize indicia 704 relative to the prize indicia display area 702, the modified symbol array 802 moves relative to the prize indicia display area 702 and relative to the prize indicia 704 contained in the prize indicia display area 702. In this example, movement of the prize indicia 704 and the modified symbol array 802 are such that movement of the modified symbol array 802 is noticeably slower than movement of the prize indicia 704.

As indicated at step 614, the game controller 202 makes a determination as to whether to select prize indicia 704 from the prize indicia display area 702 and consequently whether to add a prize symbol to the symbol array 802. If a prize symbol is to be added to the symbol array 802, the determination also involves determining which prize indicia 704 to select, how many to select, and the symbol location(s) 714 that will receive the prize symbol(s) corresponding to the selected prize indicia 704. In one or more implementations, the prize indicia 704 that the game controller 202 selects is based on a mapping between the RNG outcome to the game outcome for the feature game.

Each prize symbol corresponds to a spot prize that may be a defined prize amount or a defined jackpot amount. As shown in FIG. 8, each spot prize is represented by prize indicia 704, in this example by displaying a cash icon for each prize indicium 704 that corresponds to a spot prize in the form of a number of credits, and text for each prize indicium 704 that corresponds to a jackpot spot prize.

Figure 9:
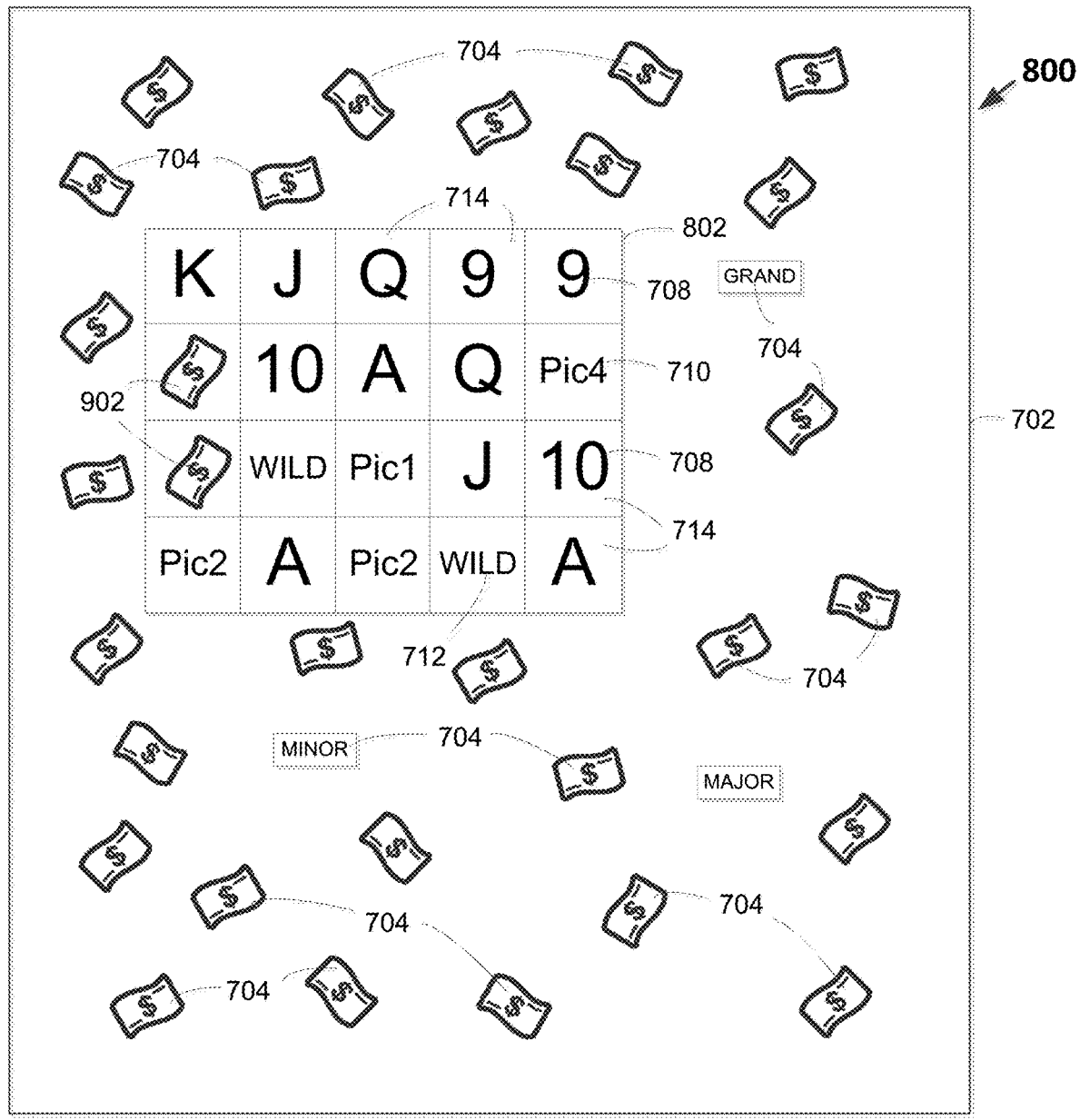

In this example, selection of a spot prize is communicated to a player by representing that at least one prize indicium 704 is 'grabbed' from the prize indicia display area 702 as the symbol array 802 moves relative to the prize indicia display area 702 and, as shown in FIG. 9, added to the symbol array 802 as prize symbols 902 in the symbol array 802.

'Grabbing' that at least one prize indicium 704 from the prize indicia display area 702 may be represented in any suitable way to communicate to the player that at least one prize indicium 704 has been selected. For example, a hand or character that grabs at least one prize indicium 704 and moves the at least one prize indicium 704 to the symbol array 802 may be displayed, or at least one prize indicium 704 may be caused to fly from the prize indicia display area 702 and land on a symbol position on the symbol array 802.

In this example, as indicated at steps 616 and 618, at the same time as prize indicia 704 are 'grabbed' from the prize indicia display area 702 and added to the symbol array 802 as prize symbols 902, or alternatively after the prize indicia 704 are 'grabbed' from the prize indicia display area 702 and added to the symbol array 802 as prize symbols 902, the reels are spun to cause new symbols to be displayed in the symbol array 802, with the added prize symbols 902 remaining at the relevant symbol position(s) 714 while the reels spin. As indicated at step 620, the added prize symbols 902 are allocated a Wild function for the purpose of determining an outcome of the game shown in the symbol array 802.

As indicated at step 622, the spot prize amount for each prize symbol 902 added to the symbol array 802 is added to the relevant player meter, and in this way the prize for each 'grabbed' prize indicium 704 is awarded irrespective of the outcome of the game shown in the symbol array 802.

As indicated at step 624, the outcome of the game shown in the symbol array 802 is then determined and a prize awarded if the symbols displayed in the symbol array 802, taking into account the Wild function of the added prize symbols 902, corresponds to a winning outcome.

In the present example shown in FIG. 9, 2 prize indicia 704 representing defined credit amount spot prizes have been 'grabbed' and added to a first reel at second and third symbol locations. The player would therefore be awarded spot prizes corresponding to the 2 'grabbed' prize indicia 704, and also a prize associated with a winning outcome in the game if such a winning outcome exists. In the present example, the symbols displayed in the symbol array 802 include a winning outcome comprising 3 Pic1 symbols along a fourth row of the symbol array 802.

Figure 10:
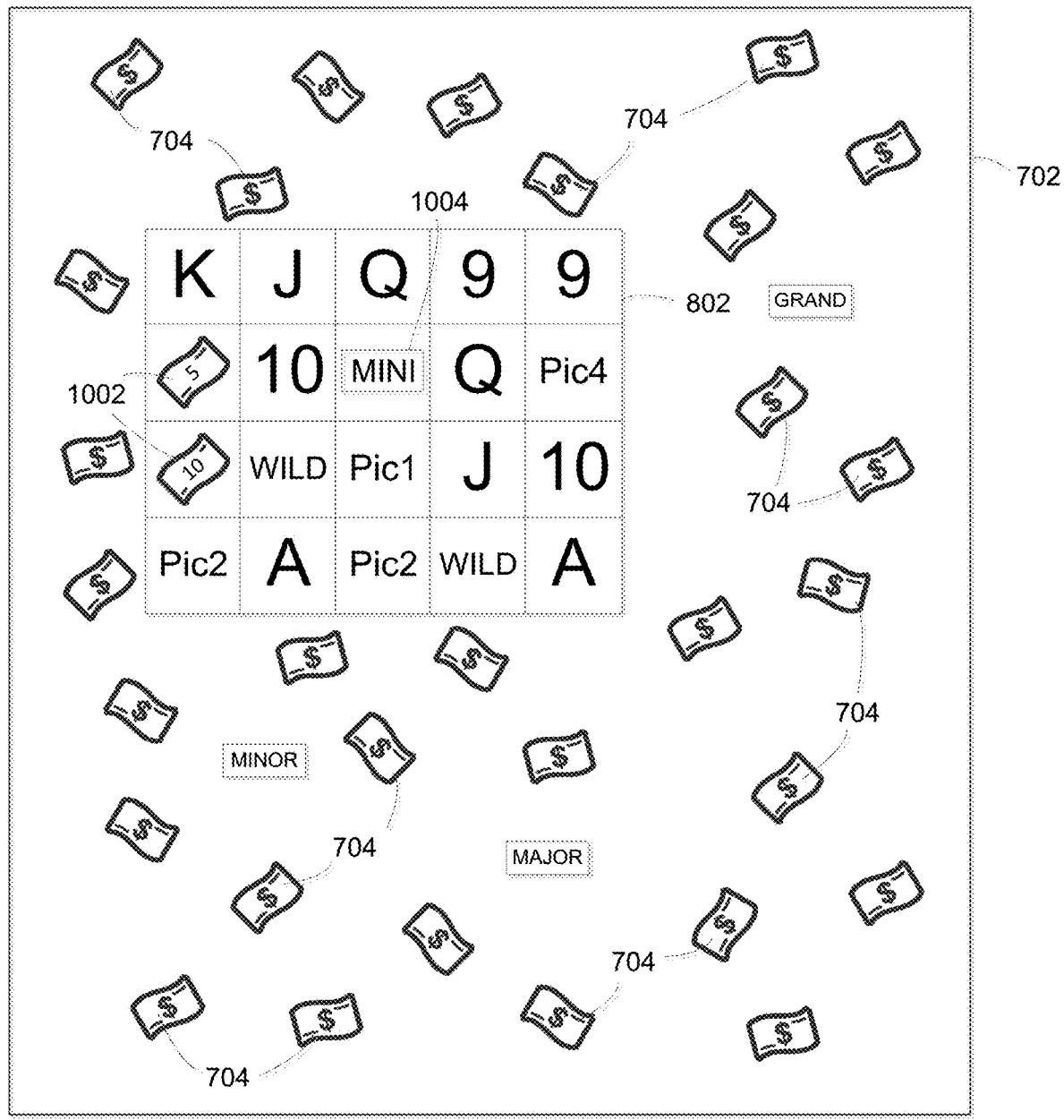

In a modification of the feature game shown in FIGS. 8 and 9, when the prize indicia 704 are 'grabbed', a credit amount that corresponds to the 'grabbed' prize indicia is displayed as part of the prize symbol 1002 shown in the symbol array 802, as shown in FIG. 10.

In the version shown in FIG. 10, a MINI jackpot prize has also been 'grabbed' and as a consequence the player is also awarded a spot prize corresponding to the current amount of the MINI jackpot. In addition, a further prize corresponding to 3 '10' symbols along the second row would also be awarded.

Figure 11:
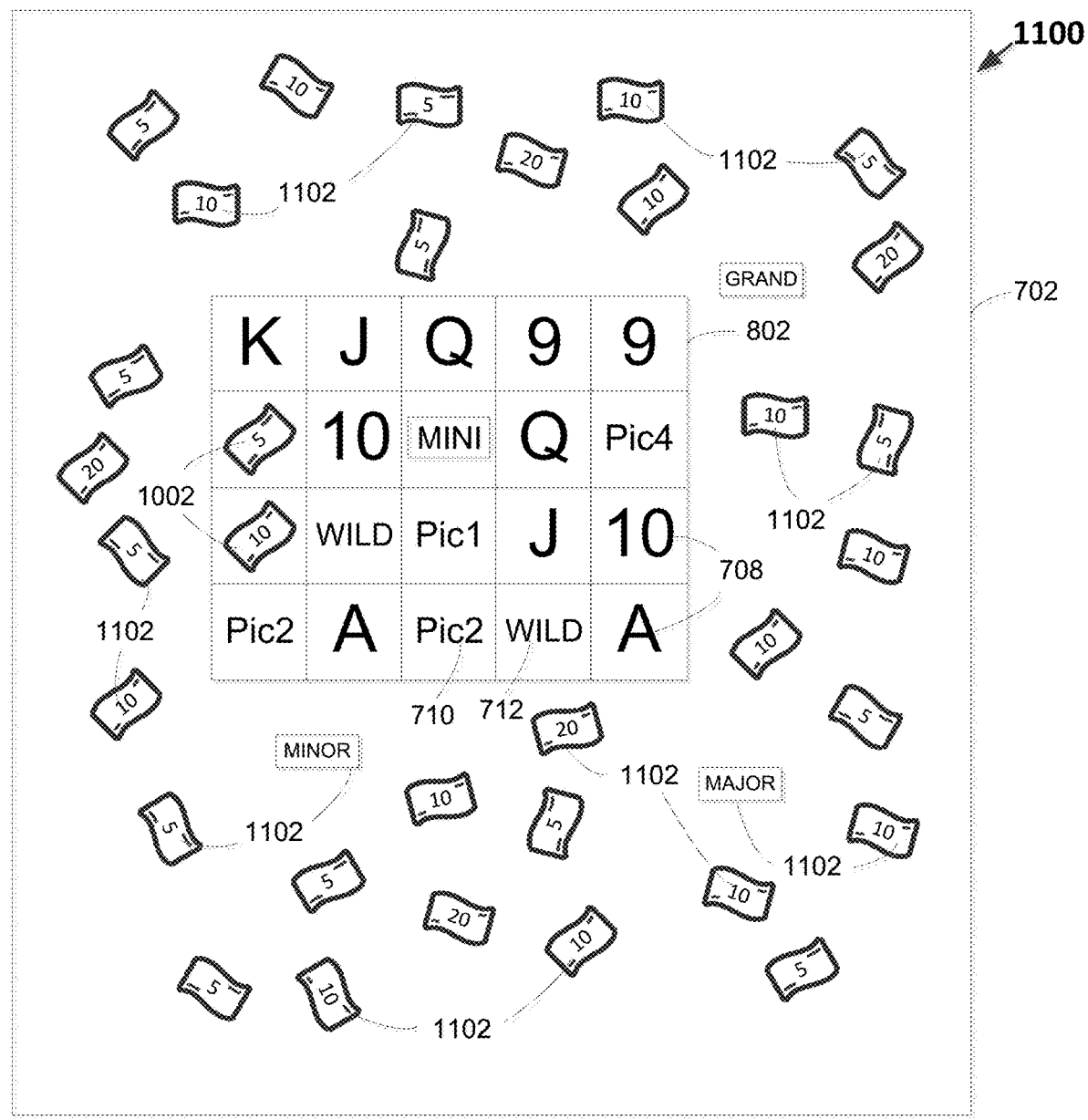
FIG. 11 is a representation of a feature game screen displayed to a player during implementation of a feature game in an alternative example embodiment described in the present disclosure.

A feature game screen 1100 of an alternative feature game implementation is shown in FIG. 11. Like and similar features are indicated with like reference numerals.

As shown in FIG. 11, in this embodiment, alternative prize indicia 1102 are shown, wherein each prize indicium 1102 associated with a defined credit value includes a displayed credit amount to indicate the credit amount associated with the prize indicium 1102.

Figure 12:
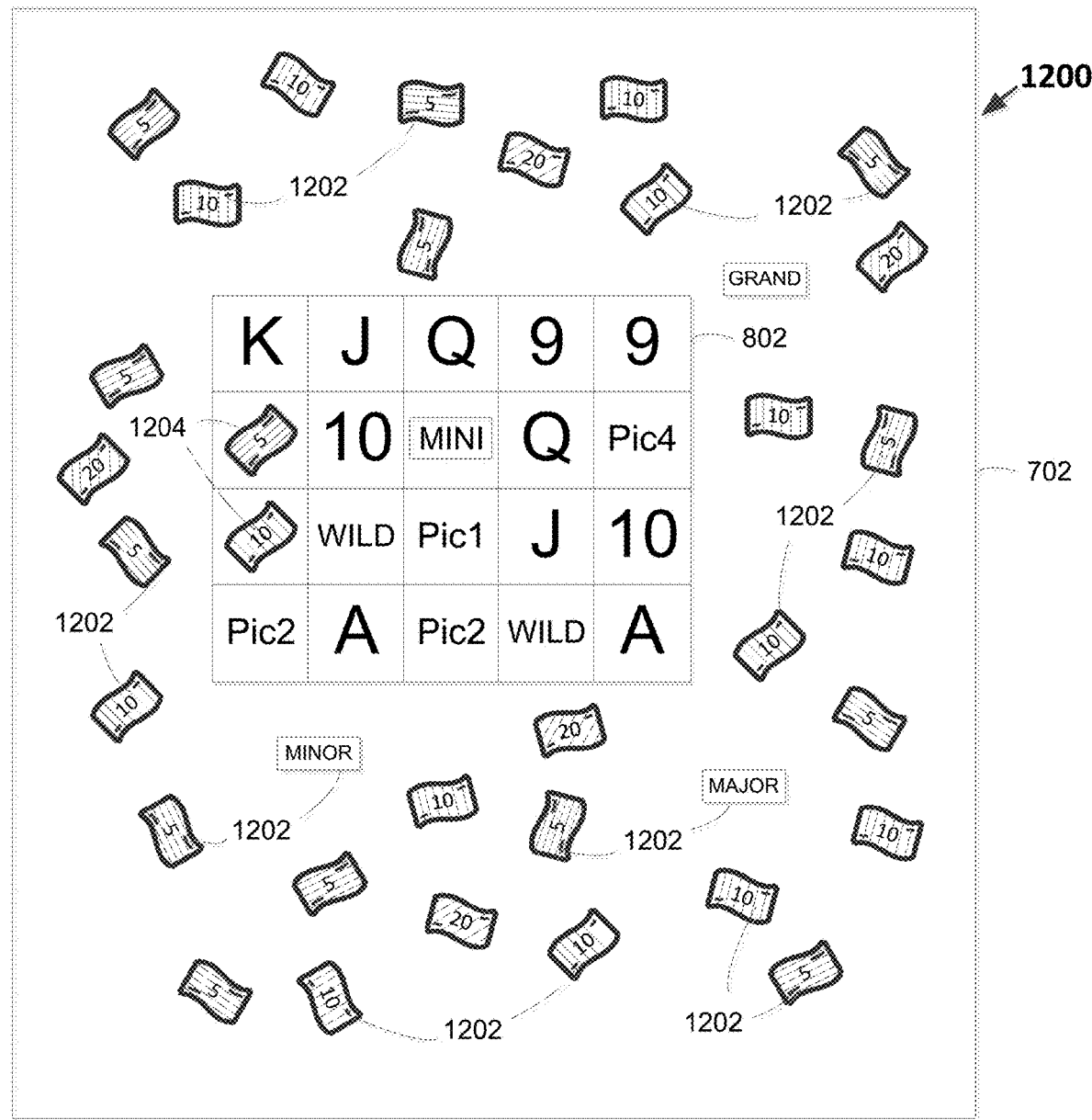
FIG. 12 is a representation of a feature game screen displayed to a player during implementation of a feature game in a further alternative example embodiment described in the present disclosure.

A feature game screen 1200 of an alternative feature game implementation is shown in FIG. 12. Like and similar features are indicated with like reference numerals.

The implementation shown in FIG. 12 is similar to the implementation shown in FIG. 11, except that the prize indicia 1202 associated with a defined credit value and the prize symbols 1204 added to the symbol array 802 are also visually distinguished from each other, for example by using a defined color for each credit amount.

Figure 13:
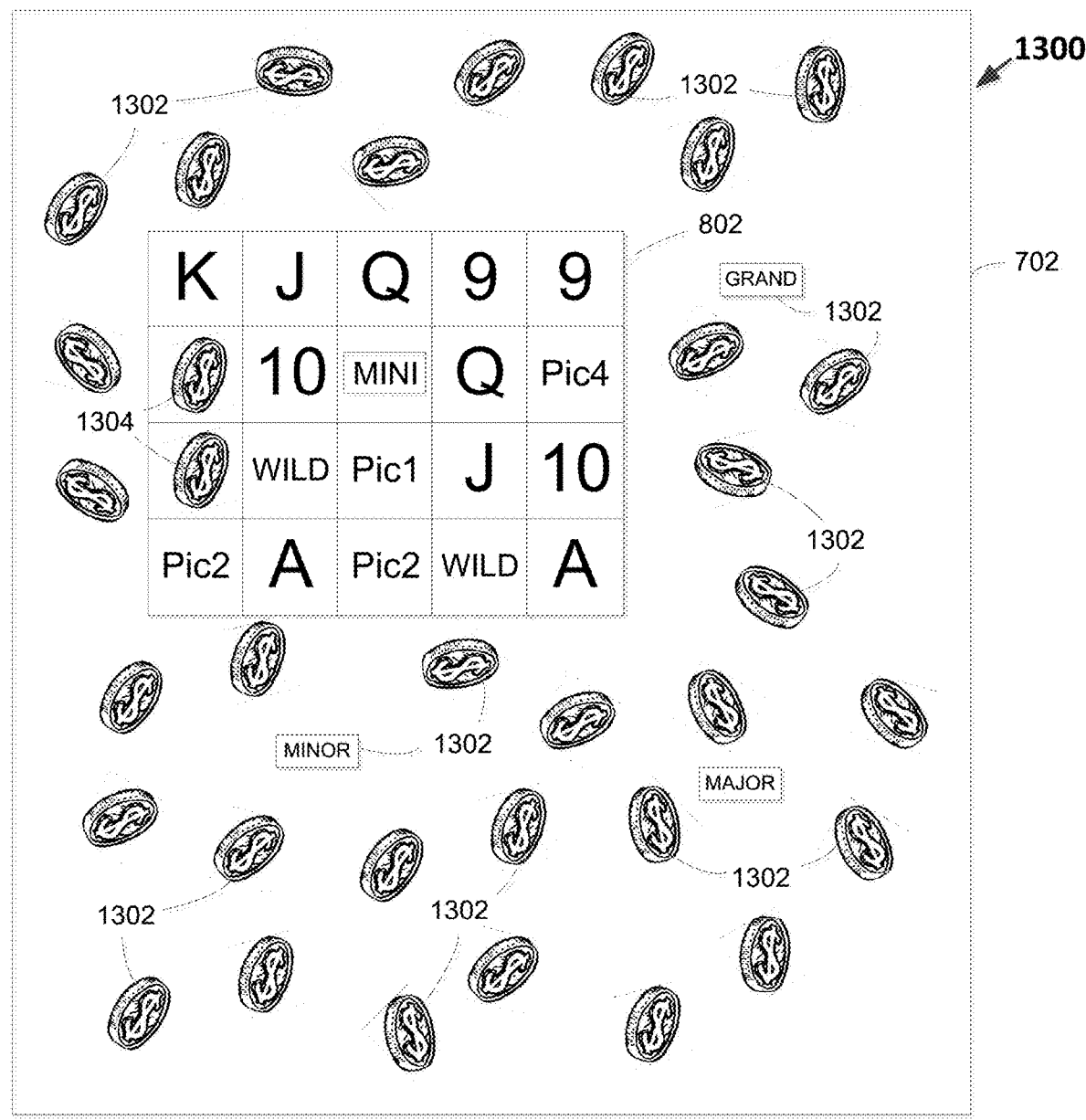
FIG. 13 is a representation of a feature game screen displayed to a player during implementation of a feature game in an alternative example embodiment described in the present disclosure.

A feature game screen 1300 of an alternative feature game implementation is shown in FIG. 13. Like and similar features are indicated with like reference numerals.

Figure 14:
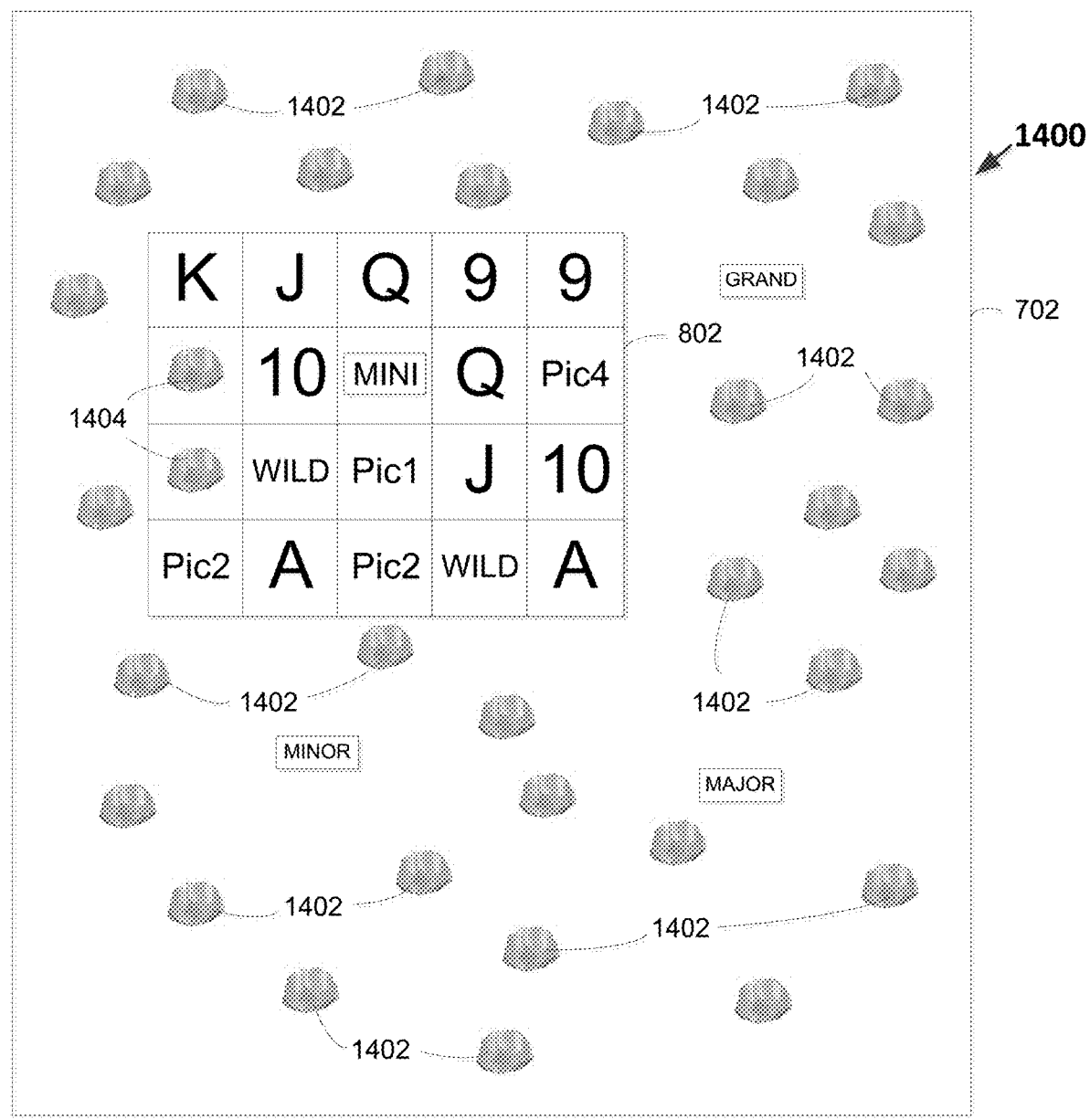
FIG. 14 is a representation of a feature game screen displayed to a player during implementation of a feature game in an alternative example embodiment described in the present disclosure.

As shown in FIG. 13, in this embodiment instead of prize indicia that visually represent bank notes, prize indicia 1302 that visually represent other items of value may be used, such as coins. A further example of other items of value that may be used is shown in FIG. 14 wherein prize indicia 1402 and prize symbols 1404 that visually represent gold nuggets are used.

Figure 15:
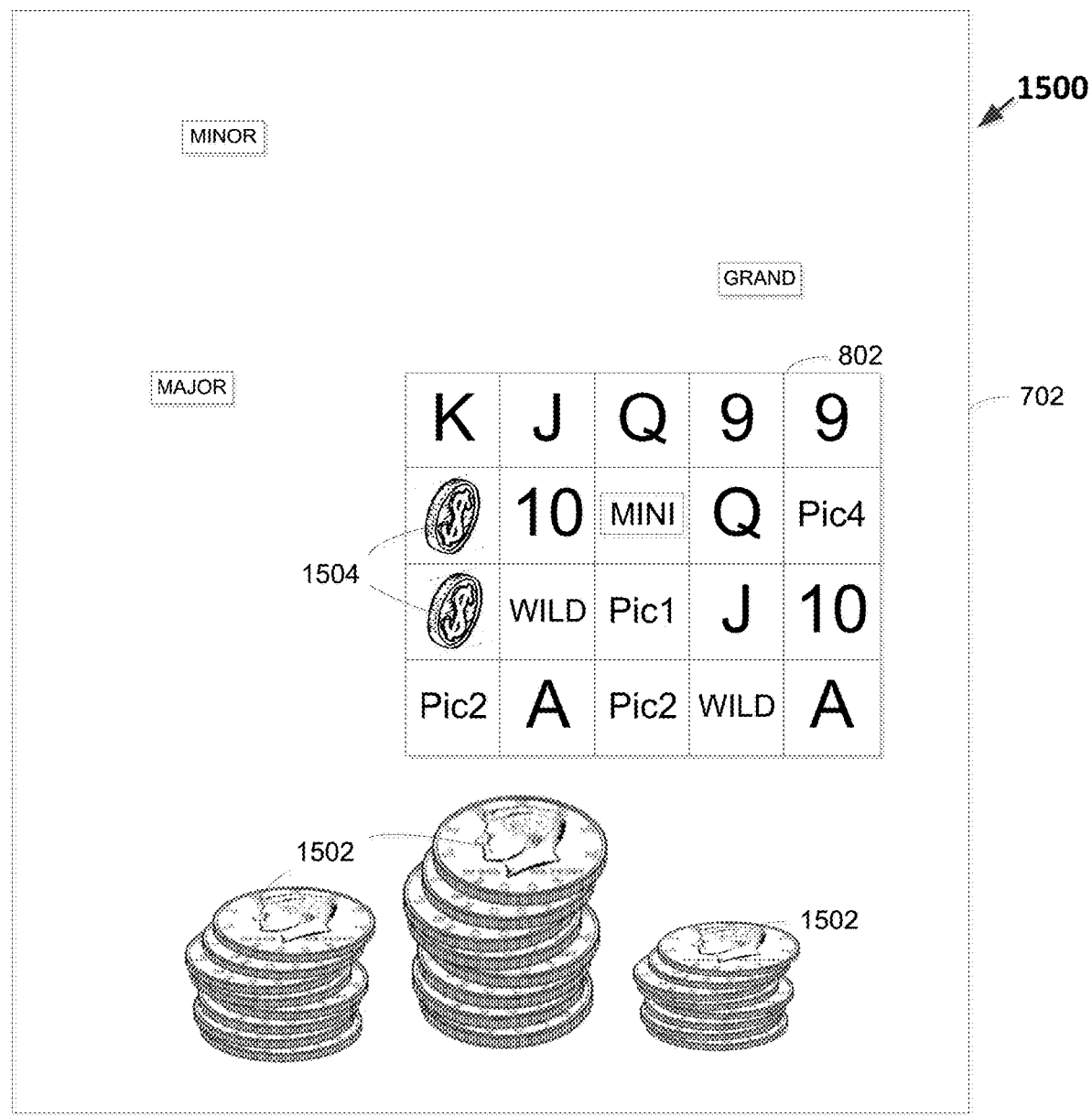
FIG. 15 is a representation of a feature game screen displayed to a player during implementation of a feature game in an alternative example embodiment described in the present disclosure.

A feature game screen 1500 of an alternative feature game implementation is shown in FIG. 15. Like and similar features are indicated with like reference numerals.

As shown in FIG. 15, in this embodiment instead of prize indicia that move around the prize indicia display area 702 and 'grab' the prize indicia as the symbol array 802 moves relative to the prize indicia display area 702, in this embodiment prize indicia 1502 are disposed at a fixed location in the prize indicia display area 702, in this example the prize indicia being representative of coins disposed in several piles. During use, at least one prize indicium 1502 may be 'grabbed' from the piles of coins as the symbol array 802 moves relative to the piles and added to the symbol array 802 as prize indicia 1504.

In a first aspect, a gaming system is provided, the gaming system comprising:
at least one display;
a game controller that includes at least one processor and at least one memory device, wherein:

the at least one processor, the at least one memory device, and the at least one display are operably connected; and the at least one memory device stores computer-readable instructions for controlling the at least one processor to:

cause prize indicia to be displayed on the at least one display, each prize indicium corresponding to a spot prize awardable to a player;

cause a symbol array to be selected and displayed on the at least one display such that the symbol array and the prize indicia move relative to each other;

select at least one spot prize corresponding to at least one prize indicium;

add at least one prize symbol corresponding to the respective selected at least one spot prize to the symbol array and allocate a Wild function to the at least one added prize symbol;

award the spot prize corresponding to the at least one added prize symbol;

determine whether the symbol array corresponds to a winning outcome; and award a winning outcome prize if a winning outcome is determined to exist.

In an embodiment, the at least one memory device stores computer-readable instructions for controlling the at least one processor to:

select a plurality of spot prizes;

add a plurality of prize symbols corresponding to the respective selected plurality of spot prizes to the symbol array and allocate a Wild function to each added prize symbol;

award a plurality of spot prizes corresponding to the plurality of added prize symbols.

In an embodiment, the at least one spot prize corresponds to a defined number of credits.

In an embodiment, at least one prize indicium visually corresponds to an item of value, such as cash that may include a bank note or a coin, or a gold nugget.

In an embodiment, the prize indicia are configured such that the appearance of the prize indicia communicates relative values of the prize indicia, for example by representing prize indicia of the same prize value in the same color and representing prize indicia of the different prize values with different colors.

In an embodiment, the symbol array and the prize indicia are caused to move relative to each other by moving the prize indicia, for example such that movement of the prize indicia is random.

In an embodiment, the symbol array and the prize indicia are caused to move relative to each other by moving the symbol array.

In an embodiment, the symbol array and the prize indicia are caused to move relative to each other by moving both the prize indicia and the symbol array, wherein the symbol array is caused to move slower than the prize indicia.

In an embodiment, the prize indicia is displayed at a defined location on the display, and the symbol array and the prize indicia are caused to move relative to each other by moving the symbol array relative to the prize indicia. With this embodiment, the prize indicia may be represented as a pile of prize indicia, such as a pile of coins.

In an embodiment, the at least one spot prize corresponds to a jackpot amount. The jackpot amount may be a progressive jackpot amount.

In an embodiment, a plurality of jackpot amounts are provided, the jackpot amounts having different size jackpot amounts.

In an embodiment, the at least one memory device stores computer-readable instructions for controlling the at least one processor to:

display a representation indicative of grabbing at least one prize indicium from the prize indicia display area.

In an embodiment, the representation indicative of grabbing at least one prize indicium includes displaying a hand or character that grabs at least one prize indicium and moves the at least one prize indicium to the symbol array.

In an embodiment, the representation indicative of grabbing at least one prize indicium includes displaying at least one prize indicium such that the at least one prize indicium flies from the prize indicia display area and lands on a symbol position on the symbol array.

In an embodiment, the at least one prize indicium includes text indicative of an amount of credits associated with the prize indicium. The amount of credits associated with the prize indicium may be included in the prize symbol when the prize symbol is added to the symbol array.

In an embodiment, the at least one memory device stores computer-readable instructions for controlling the at least one processor to:

implement a base game; and implement a feature game when a trigger condition is determined to exist during the base game, wherein during the feature game the at least one memory device stores computer-readable instructions for controlling the at least one processor to:

cause prize indicia to be displayed on the at least one display, each prize indicium corresponding to a spot prize awardable to a player;

cause a symbol array to be selected and displayed on the at least one display such that the symbol array and the prize indicia move relative to each other;

select at least one spot prize corresponding to at least one prize indicium;

add at least one prize symbol corresponding to the respective selected at least one spot prize to the symbol array and allocate a Wild function to the at least one added prize symbol;

award the spot prize corresponding to the at least one added prize symbol;

determine whether the symbol array corresponds to a winning outcome; and award a winning outcome prize if a winning outcome is determined to exist.

In an embodiment, the base game includes a first symbol array having a first configuration, and the feature game includes a second symbol array having a different configuration to the first symbol array. The second symbol array may have more rows of symbols than the first symbol array.

In a second aspect a method of gaming is provided, the method of gaming comprising:

displaying prize indicia on at least one display, each prize indicium corresponding to a spot prize awardable to a player;

selecting and displaying a symbol array on the at least one display such that the symbol array and the prize indicia move relative to each other;

selecting at least one spot prize corresponding to at least one prize indicium;

adding at least one prize symbol corresponding to the respective selected at least one spot prize to the symbol array;

allocating a Wild function to the at least one added prize symbol; awarding the spot prize corresponding to the at least one added prize symbol;

determining whether the symbol array corresponds to a winning outcome; and awarding a winning outcome prize if a winning outcome is determined to exist.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming system comprising:
a game controller that includes at least one processor and at least one memory device; and
at least one random number generator (RNG) stored in the at least one memory device, wherein:
the at least one processor and the at least one memory device, are operably connected; and
the at least one memory device stores computer-readable instructions for controlling the at least one processor to:
receive a first RNG output from the RNG;
determine locations of prize indicia in a prize indicia display area based at least in part on the first RNG output, wherein the first RNG output is mapped to the locations by mapping ranges of potential output values from the RNG to the locations in the prize indicia display area and storing the mapped ranges in the at least one memory device
cause the prize indicia to be displayed in the prize indicia display area at the determined locations, each prize indicium corresponding to a spot prize comprising a prize amount;
receive a second RNG output from the RNG;
cause a symbol array to be selected and displayed, wherein the symbol array comprises a plurality of symbols;
control movement of the symbol array and the prize indicia relative to each other based at least in part on the second RNG output;
select at least one spot prize corresponding to at least one prize indicium;
determine at least one prize symbol to be added to the symbol array, corresponding to the respective selected at least one spot prize;
cause the at least one prize symbol to be displayed in the symbol array;
present, in response to the at least one prize symbol being displayed in the symbol array and irrespective of a game outcome based upon a pay table, the prize amount of the spot prize corresponding to the at least one prize symbol displayed in the symbol array;
allocate a wild function to the at least one added prize symbol;
determine, based upon a pay table stored in the at least one memory device, the wild function, and the symbol array, to present a winning outcome amount corresponding to a winning outcome; and
present the winning outcome amount.

2. A gaming system as claimed in claim 1, wherein the at least one memory device stores computer-readable instructions for controlling the at least one processor to:
select a plurality of spot prizes;
cause a plurality of prize symbols to be moved to the symbol array and allocate a Wild function to each prize symbol moved to the symbol array, wherein the plurality of moved prize symbols corresponds to the respective plurality of spot prizes; and
provide a plurality of spot prizes corresponding to the plurality of moved prize symbols.

3. A gaming system as claimed in claim 1, wherein the prize indicia are configured such that the appearance of the prize indicia communicates relative values of the prize indicia.

4. A gaming system as claimed in claim 3, wherein the prize indicia are configured such that the appearance of the prize indicia communicates relative values of the prize indicia by representing prize indicia of the same prize value in the same color and representing prize indicia of different prize values with different colors.

5. A gaming system as claimed in claim 1, wherein the symbol array and the prize indicia are caused to move relative to each other by moving the prize indicia.

6. A gaming system as claimed in claim 1, wherein the symbol array and the prize indicia are caused to move relative to each other by moving the symbol array.

7. A gaming system as claimed in claim 6, wherein the prize indicia is displayed at a defined location.

8. A gaming system as claimed in claim 7, wherein the prize indicia are represented as a pile of prize indicia.

9. A gaming system as claimed in claim 1, wherein the symbol array and the prize indicia are caused to move relative to each other by moving both the prize indicia and the symbol array.

10. A gaming system as claimed in claim 9, wherein the symbol array is caused to move slower than the prize indicia.

11. A gaming system as claimed in claim 1, wherein the at least one spot prize corresponds to a jackpot amount.

12. A gaming system as claimed in claim 11, wherein the jackpot amount is a progressive jackpot amount.

13. A gaming system as claimed in claim 1, wherein a plurality of jackpot amounts are provided, the plurality of jackpot amounts having different sizes.

14. A gaming system as claimed in claim 1, wherein the at least one memory device stores computer-readable instructions for controlling the at least one processor to:
display a representation indicative of grabbing at least one prize indicium from the prize indicia display area, wherein the representation indicative of grabbing at least one prize indicium includes displaying a character that grabs at least one prize indicium and moves the at least one prize indicium to the symbol array.

15. A gaming system as claimed in claim 1, wherein the at least one memory device stores computer-readable instructions for controlling the at least one processor to:
display a representation indicative of grabbing at least one prize indicium from the prize indicia display area, wherein the representation indicative of grabbing at least one prize indicium includes displaying at least one prize indicium such that the at least one prize indicium flies from the prize indicia display area and lands on a symbol position on the symbol array.

16. A gaming system as claimed in claim 1, wherein the at least one prize indicium includes text indicative of an amount of credits associated with the prize indicium.

17. A gaming system as claimed in claim 16, wherein the amount of credits associated with the prize indicium is included in the prize symbol when the prize symbol is added to the symbol array.

18. A gaming system as claimed in claim 1, wherein the at least one memory device stores computer-readable instructions for controlling the at least one processor to determine a target level of return to player (RTP).

19. A gaming system as claimed in claim 18, wherein the at least one memory device stores computer-readable instructions for controlling the at least one processor to determine the at least one prize symbol to be added to the symbol array based at least in part upon the target level of RTP.

20. A gaming system as claimed in claim 19, wherein the at least one memory device stores computer-readable instructions for controlling the at least one processor to determine to present the winning outcome amount based at least in part upon the target level of RTP.

\* \* \* \* \*